Aug. 7, 1928.

M. JAEGER 1,679,527

VESSEL HANDLING DEVICE

Filed Oct. 18, 1924　　7 Sheets-Sheet 1

INVENTOR
Max Jaeger
BY
George Ramsey
his ATTORNEY

Aug. 7, 1928.  
M. JAEGER  
1,679,527  
VESSEL HANDLING DEVICE  
Filed Oct. 18, 1924  
7 Sheets-Sheet 3

INVENTOR  
Max Jaeger  
BY  
his ATTORNEY

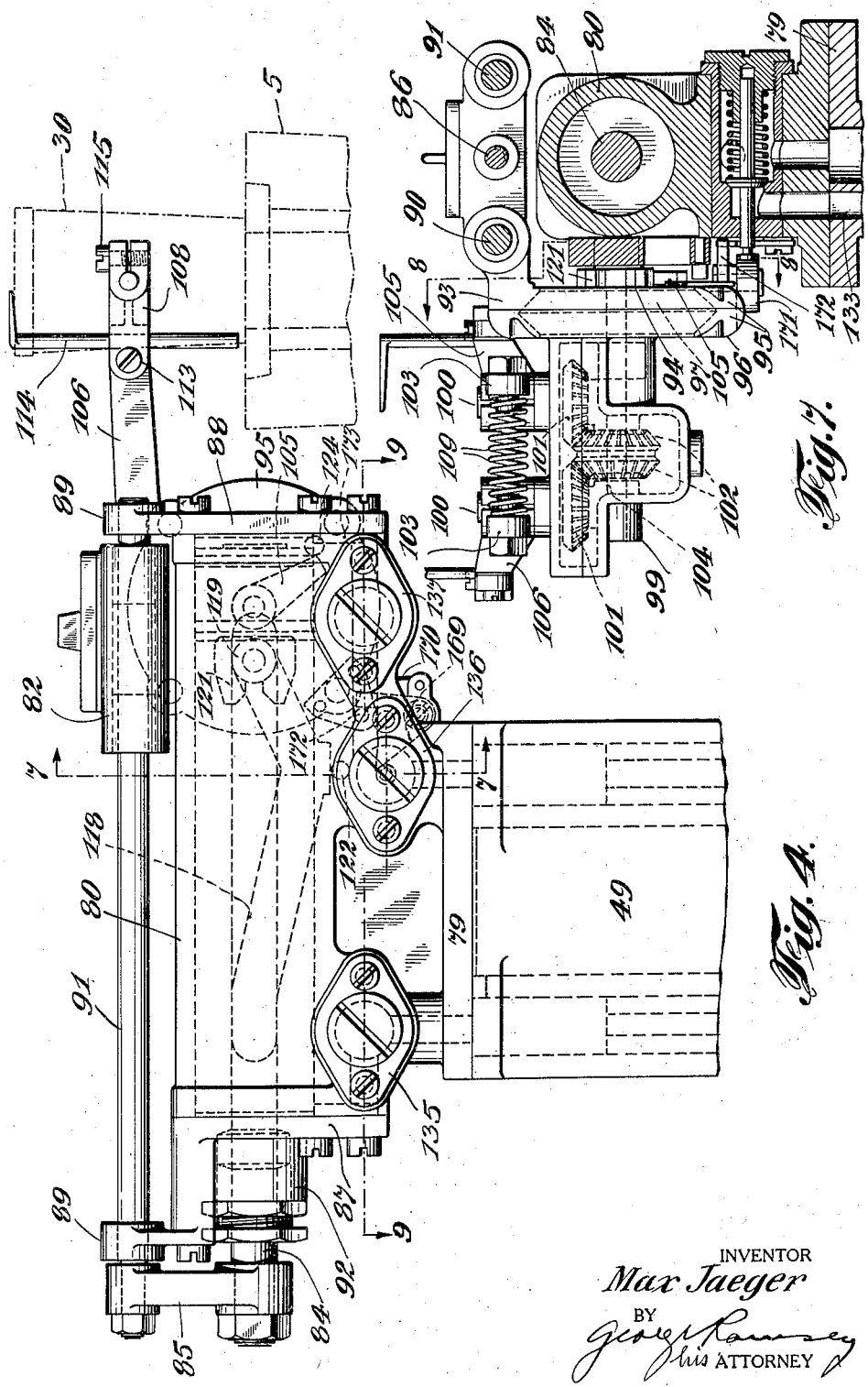

Aug. 7, 1928.

M. JAEGER 1,679,527

VESSEL HANDLING DEVICE

Filed Oct. 18, 1924

INVENTOR
Max Jaeger
BY
*his* ATTORNEY

Aug. 7, 1928.

M. JAEGER 1,679,527

VESSEL HANDLING DEVICE

Filed Oct. 18, 1924    7 Sheets-Sheet 6

INVENTOR
Max Jaeger
BY
his ATTORNEY

Aug. 7, 1928.
M. JAEGER
1,679,527
VESSEL HANDLING DEVICE
Filed Oct. 18, 1924
7 Sheets-Sheet 7
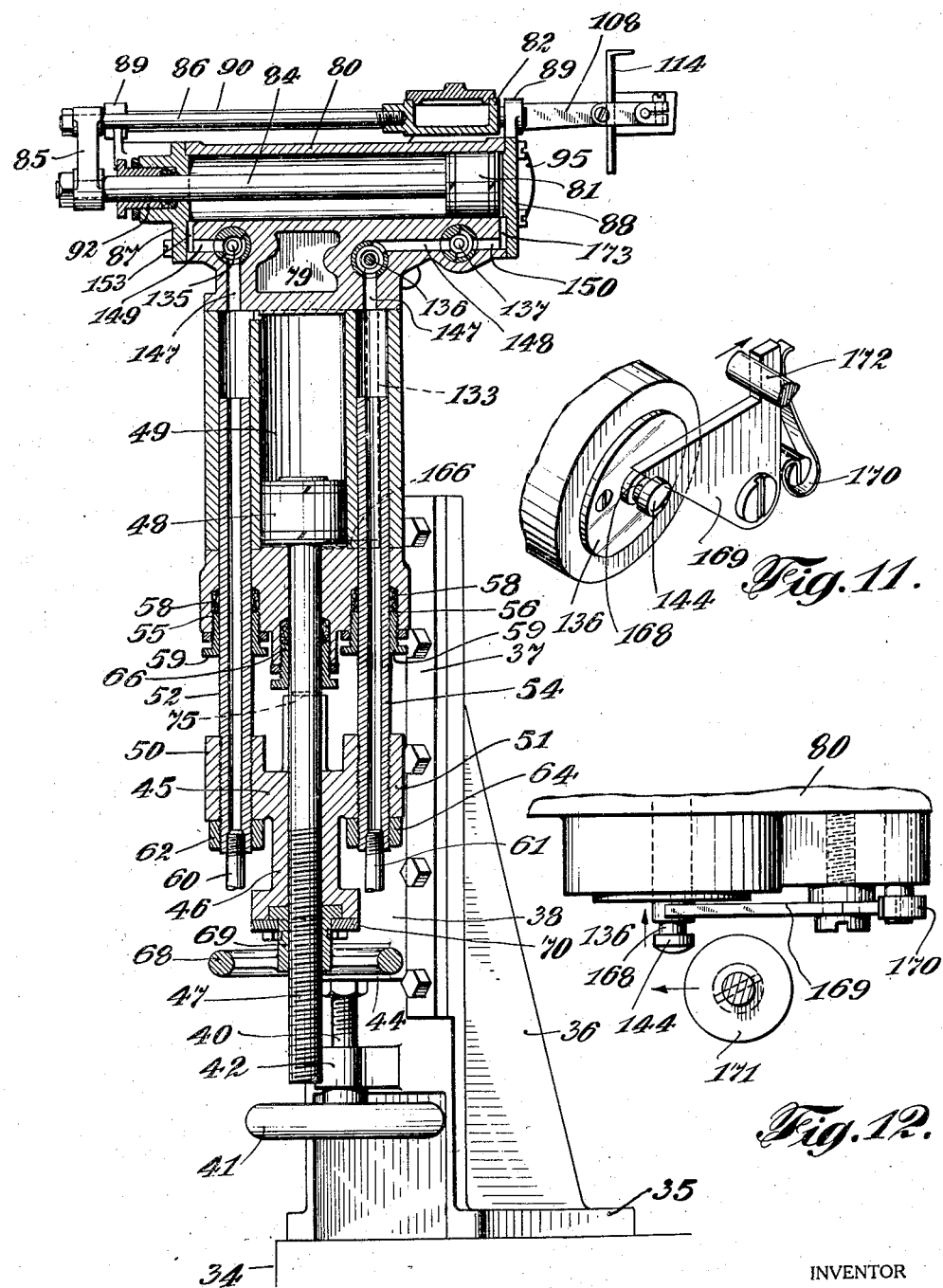
INVENTOR
Max Jaeger
BY
his ATTORNEY Patented Aug. 7, 1928.

1,679,527

UNITED STATES PATENT OFFICE.

MAX JAEGER, OF LONG ISLAND CITY, NEW YORK, ASSIGNOR TO ANCHOR CAP AND CLOSURE CORPORATION, OF LONG ISLAND CITY, NEW YORK, A CORPORATION OF NEW YORK.

VESSEL-HANDLING DEVICE.

Application filed October 18, 1924. Serial No. 744,307.

The present invention relates to vessel handling devices and more particularly to a device for transferring containers from a glass machine to a conveyor.

An object of the present invention is to provide an automatic device for engaging and raising vessels from one support and placing them on another support or conveyor from which the vessels may be transferred to their destination.

Another object of the invention is to transfer automatically, without the aid of an operator, vessels from a glass machine to a conveyor whereby the utilization of skilled labor to take the respective molded articles with grippers and place them on a conveyor is eliminated.

Another object of the invention is to provide an automatic device to be used in connection with glass machines, in which gobs of molten glass are dropped into suitable molds and pressed into shape, which will raise the vessel from the mold during the regular stops of the machine, engage the vessel, and transfer it to a suitable conveyor.

A further object of the invention is to provide a device adapted to raise vessels from the molds of a glass machine, engage the raised vessels, lift them clear of the glass machine, and move them horizontally to a conveyor, at the same time lowering the vessel to the level of the conveyor whereby the transfer operation is independent of the size of the vessel or the relative heights of the conveyor and the mold table of the glass machine.

A still further object of the invention is to provide a horizontal cylinder adapted to operate a vessel engaging means to raise a vessel from a glass machine and transfer it to another position at substantially the level of the glass machine molds; to mount the horizontal cylinder on a vertical cylinder movable on a stationary piston to permit thereby vertical movement of the horizontal cylinder so that the vessel may be placed on a conveyor irrespective of the heights of the various elements of the glass machine.

A more specific object of the invention is to provide a pair of arms pivotally mounted with vessel engaging fingers at the ends thereof and having a spring for maintaining the fingers in engagement with a vessel; to provide a piston pneumatically operated in a horizontal cylinder for causing said arms to engage a vessel automatically and to swing the vessel through a curved orbit in a vertical plane and deposit it on a conveyor; and to provide a vertical cylinder on a stationary piston adapted to move the horizontal cylinder in a vertical direction to compensate for the difference in height of the vessel engaged and in the height of the conveyor on which it is placed.

A further specific object is to provide a horizontal cylinder for horizontal movement of a vessel and to provide a vertical cylinder for vertical movement of the vessel; to provide a valve for admitting air to the vertical cylinder equipped with a locking mechanism which prevents vertical movement of the horizontal cylinder until the vessel clears the various elements of the glass machine under it, whereby breakage is prevented.

A further specific object is the provision of a pair of adjustable valves adapted to regulate the flow of air to the respective ends of the horizontal cylinder to control thereby the rate of movement of the vessel engaging arms, the provision of a third valve to control the admission of air into one end of the vertical cylinder, said valve being dependent upon the movement of the piston in the horizontal cylinder; and the provision of means to lock the third valve while said piston is in intermediate predetermined positions.

Further objects of this invention contemplate a device of the above characteristics which is of such strong and simple construction and such accurate operation as to insure its proper performance under all conditions commonly encountered in this class of work, to provide a machine which will greatly minimize the labor required in the operation of a glass machine and particularly in transferring vessels from a glass machine to a conveyor.

Other and further objects of the invention will be obvious upon an understanding of the illustrated embodiment about to be described or will be obvious from the accompanying drawings or indicated in the appended claims, and various advantages secured by the invention other than those hereinafter specifically referred to will occur to one skilled in the art or become evident upon employment of the invention in practice.

A preferred form of the invention has been chosen for purposes of description and is shown in the accompanying drawings wherein:

Figs. 4, 5 and 6 are detailed views showing the horizontal cylinder in different vertical positions with the corresponding positions of the vessel;

Fig. 7 is a cross-sectional view along line 7—7 of Fig. 4;

Fig. 10 is a cross-sectional view showing the air conduits through the wall of the vertical cylinder and to the horizontal cylinder;

Figs. 11 and 12 are detailed views of the locking mechanism controlling the valve which admits air to one end of the vertical cylinder.

Figure 1:
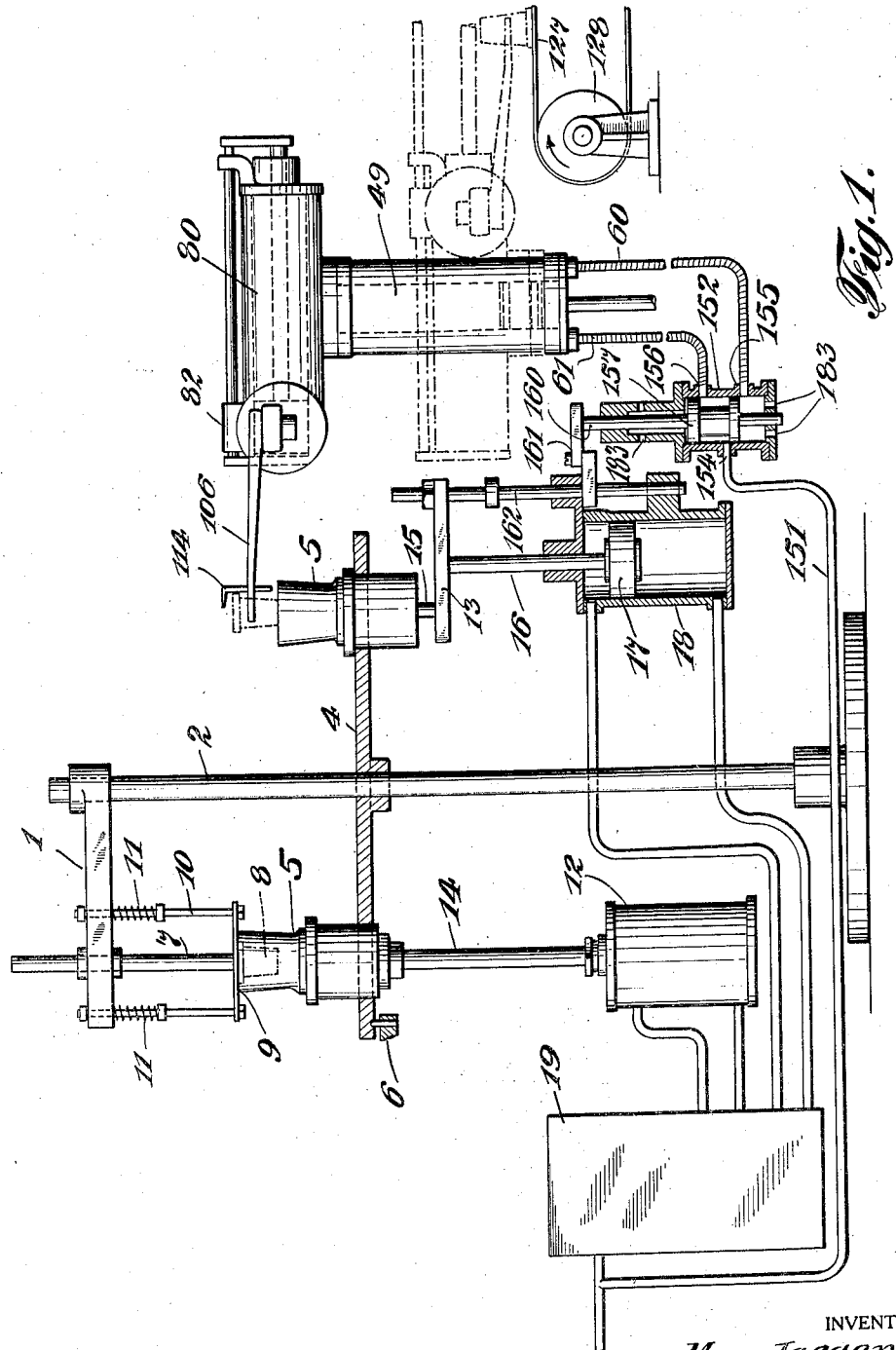
Fig. 1 is a diagrammatic view of the transferring device applied to a glass machine.

Heretofore in the operation of glass machines a plurality of molds have been arranged on a table and so positioned that gobs of molten glass were dropped into the respective molds as the table was intermittenly rotated. During the periods of rest, a die of a predetermined shape was pressed into the mold to form a vessel and then removed leaving the vessel in the mold in a semi-rigid state. It was then necessary to raise the vessel from the mold and move it manually to a conveyor. This was done ordinarily by a plunger which acted on the bottom of the vessel to expel it from the mold during the period that a vessel was being formed and while the table was at rest. Upon its being raised an operator grasped it with a pair of grippers and moved it to a conveyor. This required the constant attention of a skilled workman, which was very expensive and in addition occasioned considerable breakage due to careless handling, and many of the vessels were deformed because of the pressure applied by the grippers before the vessels were completely cooled.

The present invention eliminates the difficulties of the prior art by providing a device which engages the vessels as they are expelled from the molds without applying excessive radial pressure and raises the vessel directly from the mold to clear the various elements of the glass machine and thereby prevent breakage, and then transfers it to a conveyor which may carry it to the packing room or to other machines.

More particularly the invention comprises an automatic transferring device adapted to be used in connection with glass machines, wherein a plunger is pneumatically operated to raise the vessel from the molds and simultaneously a pair of mechanical grippers are operated pneumatically to loosely enclose the vessel and subsequently rotate it in a vertical plane through an angle of 180°. At the same time the grippers are moved by compressed air, acting in a horizontal cylinder, a horizontal distance sufficient to cause the glass vessel to clear both the glass machine and the present device. The horizontal cylinder is in turn mounted upon a vertical cylinder which moves in an upward and downward direction on a stationary piston. The carriage upon which the grippers are mounted actuates a valve at a certain point in its movement which admits air into one end of the vertical cylinder and thereby lowers the vertical cylinder which in turn lowers the horizontal cylinder, the grippers, and the glass vessel to such a point that the vessel will rest upon the conveyor at the termination of its movement and be moved from the grippers by the conveyor. Suitable adjustments are provided whereby the entire device may be raised or lowered at will to adapt it for use with glass machines having tables of different heights. Furthermore, the piston rod of the vertical cylinder is adjustable in length whereby the vertical movement of the tumbler may be changed so that vessels of different heights may be handled with facility, and placed on a conveyor irrespective of its height. Adjustable valves are provided for controlling the flow of air into the ends of the horizontal cylinder and thereby regulating the speed at which the vessels are transferred.

Referring now to the drawings and more particularly to Fig. 1, which shows diagrammatically the application of the present invention to glass machines and the like, there is a yoke 1 mounted on a pedestal 2. The pedestal carries a rotating table 4 having molds 5 thereon, which is locked at each station by a bolt 6 automatically operated with the movement of the mold table. The yoke 1 carries a pressing plunger staff 7 on which is mounted a plunger head 8. A ring mold 9 is carried by a pair of rods 10 mounted in the yoke 1 and resiliently held in their lower position by springs 11. A cylinder 12 actuates a rod 14 through a suitable piston to force the mold 5 toward the plunger head 8, whereby the gob of molten glass which has been placed in the mold by mechanisms not shown is pressed to form a vessel of desired shape. Thereafter the table 4 is rotated until another mold is beneath the plunger head 8 at which time the table is locked in position and the operation is repeated. These elements illustrate diagrammatically a glass machine and its operations are well known in the art.

Figure 2:
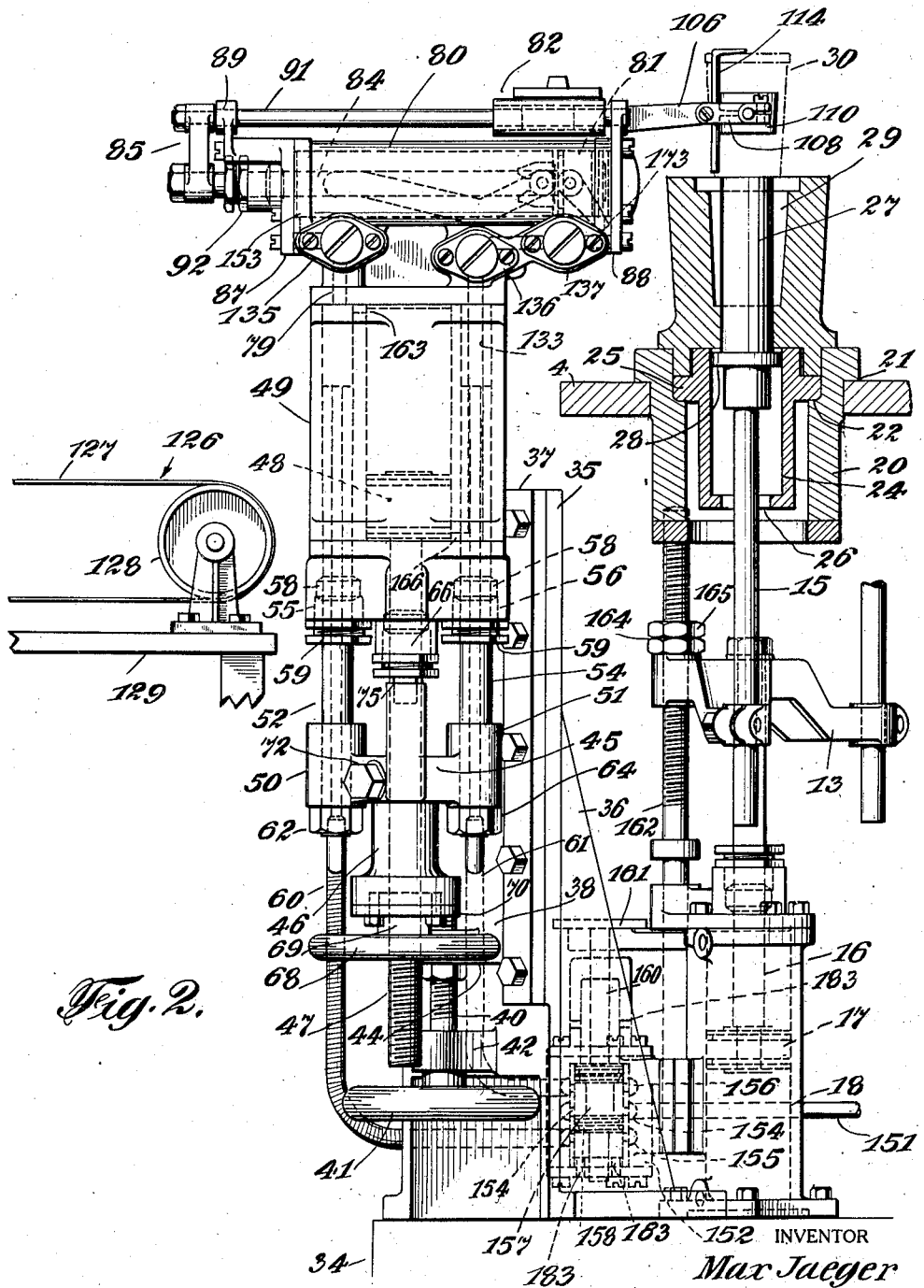
Fig. 2 is a side elevation of the device.
Figure 3:
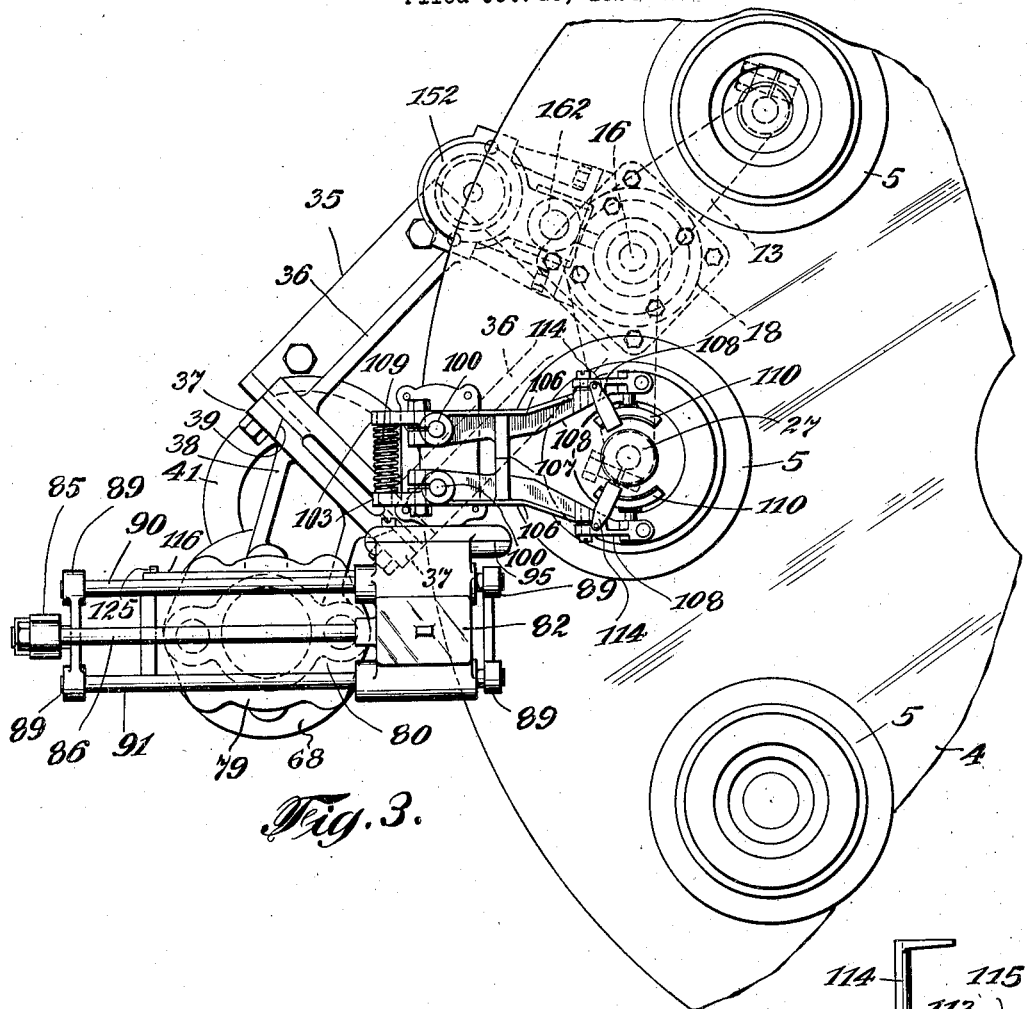
Fig. 3 is a top plan view.

Under another portion of the table and preferably diagonally opposite the vessel forming mechanism, there is provided a plunger rod 15 actuated by a piston rod 16 operatively connected to a piston 17 in a cylinder 18. A timer 19 of known construction supplies compressed air periodically to the respective ends of the cylinders 12 and 18 to control their movements. Each of the molds 5 is preferably formed with a base portion 20 having shoulders 21 on its exterior adapted to fit on the table 4 and having a shoulder 22 on its interior adapted to seat an inner cup 24 by engaging a shoulder 25 thereon. The bottom of the cup has an aperture 26 therein adapted to seat the vessel supporting plunger 27 by engaging its shoulder 28 and adapted also to permit the entry of the rod 15 to actuate the plunger and raise the vessel from the mold. The upper part of the mold is hollowed at 29 to receive the gobs of glass and has its bottom formed by the plunger 27 as it rests upon the bottom of the cup 24. The entire cup 24 and the upper part of the mold 5 are adapted to be raised by the piston rod 14 to engage the pressing head 8 during the vessel forming operation, and when the mold reaches a position diametrically opposite the pressing mechanism, the rod 15 enters through the bottom of the cup 24 to actuate the plunger 27 and raise the glass vessel 30 as shown in Fig. 2. It will be understood that these operations are continuous and that a vessel is raised and removed from the glass machine during each pressing operation.

Mounted adjacent the cylinder 18 and associated mechanism on a foundation 34 is a supporting bracket 35 braced by a pair of integral webs 36 and having a vertical runway formed thereon by a pair of bars 37 bolted thereto. A slab 38 having its edges bevelled at 39 to cooperate and fit between the bars 37 slides in the run-way on the bracket 35. A threaded shaft 40 having a hand wheel 41 at its lower end extends through the extension 42 on the lower portion of the bracket 35 and threads into the extension 44 on the slab 38 so that by rotation of the hand wheel, the extensions 42 and 44 may be moved towards or away from each other and thereby raise or lower the slab and mechanism thereon. A second extension 45 integral with the slab 38 is provided with three sleeves. The central sleeve 46 is adapted to receive a threaded piston rod 47 leading to a stationary piston 48 on which is mounted a vertical cylinder 49. The other two sleeves 50 and 51 are threaded to a pair of air pipes 52 and 54. The upper ends of the pipes slide in cylindrical bores in the wall of the cylinder 49 and are provided with packing glands 55 and 56 which consist of a suitable packing 58 held in place by sleeves 59 threaded into the lower cylinder head. The other ends of the pipes, attached to tubes 60 and 61, are locked in position by means of the nuts 62 and 64 threaded on the ends of the pipes.

The piston rod 47 has a packing gland 66 similar in all respects to the glands 55 and 56. The lower end of the piston rod 47 is threaded with a hand wheel 68 integral with a rotatable sleeve 69. This is held in position by a plate 70 mounted on the lower end of the member 45. The rotation of the hand wheel and sleeve moves the piston 48 in a vertical direction. Air is admitted to the respective ends of the vertical cylinder 49 to reciprocate it on piston 48 as will be described hereinafter. The impact of the cylinder with the supporting member 45 in its downward movement is taken up by a pair of rubber plugs 75 mounted in cups at the upper ends of a pair of rods integrally cast with the member 45 and displaced substantially 90° from the sleeves 50 and 51 about the piston rod 47.

The upper head 79 of the cylinder 49 forms a supporting structure for the integrally cast horizontal cylinder 80 and the vessel engaging and transferring mechanism about to be described. The horizontal cylinder 80 is adapted to receive air intermittently at its respective ends to reciprocate a piston 81 therein which in turn reciprocates a carriage 82 through the piston rod 84, yoke-member 85, and rod 86 attached to the carriage. Cylinder heads 87 and 88 are extended upwardly beyond the cylinder 80 and provided with bearings 89 in which the rods 90 and 91 are mounted to form run-ways for the carriage 82. A packing gland 92 is formed between the piston rod 84 and the cylinder head 87 as described hereinbefore with respect to the piston rod 47.

The carriage 82 has a lateral extension 93 with a leg 94 extending downwardly to form one-half of a bearing 95. A cooperating member 96 is bolted to the leg 94 to hold the rotating part 97 of the bearing 95 on which the vessel transferring mechanism is mounted. The rotating member 97 is integral with an extension 99 on which is mounted a pair of vertical shafts 100 having bevelled gears 101 at the lower ends thereof engaging bevelled gears 102 on shaft 104, which extends through the center portion of the bearing 95 and has a finger 105 mounted on its end to rotate same relative to part 97 and extension 99 as described hereinafter. A pair of arms 106 are mounted on the shafts 100. The central portions 107 of the arms are extended inwardly to engage each other and limit the inward movement of the longer ends 108 under pressure exerted by spring 109 mounted between the shorter ends 103 thereof. The longer ends of the arms are bifurcated to receive the stems of vessel holding members 110 which are bolted therein. A pair of fingers 114 extend upwardly from the arms 106 and are bent at their upper ends to fit over the side wall of a vessel 30 and are adapted to be adjusted in a vertical direction by means of screws 113 to permit their upper ends to fit over a vessel of any size. When the shafts 100 are rotated in opposite directions by means of shaft 104, the arms 106 move inwardly to receive and engage a vessel or outwardly to disengage same. The holding members 110 are adjusted by means of the bolts 115 so that the vessel is held therebetween very loosely and preferably with a slight space between the vessel and the members so that no pressure will be applied to the side wall of the vessel until it is raised from its support and then only sufficient pressure to hold the vessel.

Figure 8:
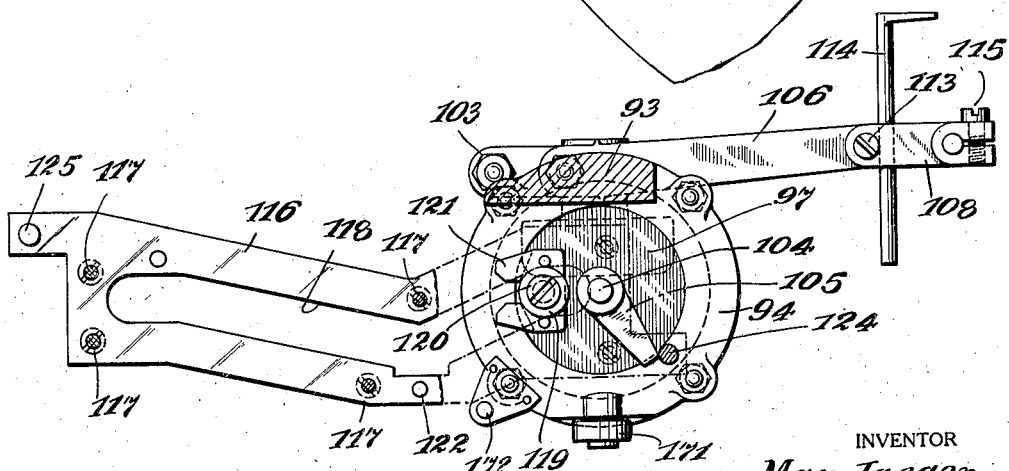
Fig. 8 is a detailed cross-sectional view along line 8—8 of Fig. 7.
Figure 6:
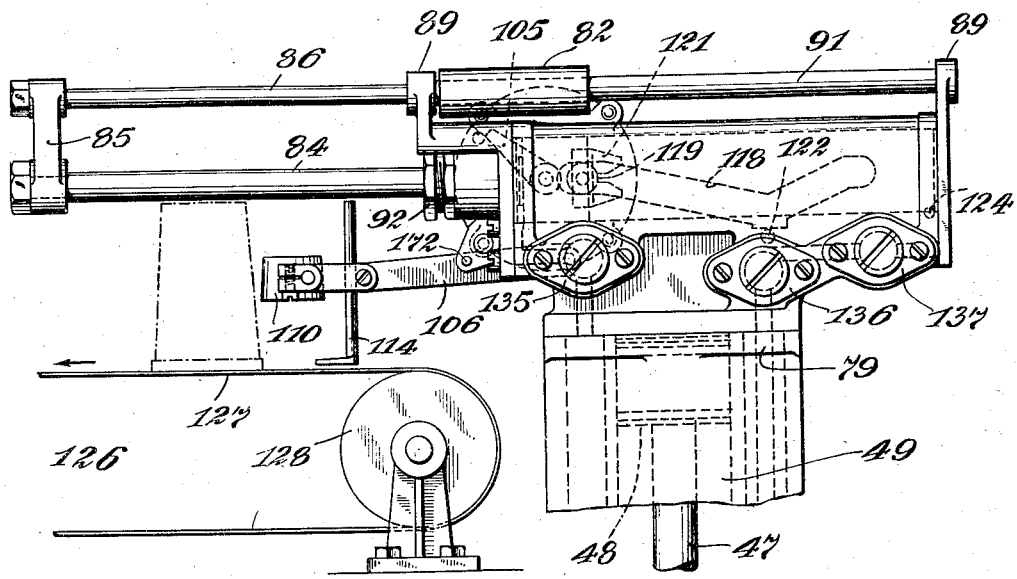

When air is admitted to the right hand end of the cylinder 80, the bearing 95 together with carriage 82 is moved longitudinally of the cylinder and parallel to the plate 116, which is mounted on the side of the cylinder 80 by means of screws 117. The plate 116 is V-shaped and has a channel 118 therein likewise substantially V-shaped as shown in Fig. 8 with the upper ends of the V extended outwardly in a horizontal direction. A cylindrical knob 119 is eccentrically mounted on the rotating part 97 of bearing 95 by the bolt 120 and fits into channel 118 in the plate. As the carriage 82 moves along the plate, the knob 119 follows the channel and rotates the member 97 through substantially 90° when it reaches the bottom of the V. At this point the slotted plate 121 extending around the knob engages the projection 122 at the bottom of the V forcing the bearing to continue to rotate in the same direction as it moves upwardly along the other side of the channel 118. In this manner the rotatable part 97 of bearing 95 and likewise the arms 106 are rotated through an angle of 180° in moving from one end of the horizontal cylinder to the other end, the projection 122 engaging the plate 121 to prevent reversal of rotation at the bottom of the V when the knob 120 passes its dead center with respect to the center of the bearing. The projections 124 and 125 are formed at diagonally opposite corners of the plate 116 to engage the finger 105 at the extremities of the horizontal movement of the bearing 95 and while the knob 120 is in the horizontal portions of the channel 118. The engagement of the finger 105 with either of the projections 124 or 125 rotates shaft 104 relative to bearing 95 which in turn rotates shafts 102 through the bevelled gears 101 and 102, thereby opening the ends 106 of the vessel engaging arms in opposition to the spring 109 so that the vessel may enter between the engaging members or be moved therefrom depending upon whether the arms are being placed over the mold 5 or over the conveyor 126. The conveyor is shown diagrammatically adjacent the table 4 as a belt 127 on a pulley 128 mounted on a suitable foundation 129. Any type of conveyor can be used with similar advantages. It will be seen therefore, that when the piston 81 makes a complete cycle in the cylinder 80, a vessel is engaged by the arms 106 and rotated through 180°, and at the same time is moved horizontally a distance equal to the stroke of the piston. At the end of the stroke, the arms are removed from contact with the vessel and the belt 127 engages the vessel and removes it from the fingers 114, as shown in Fig. 6.

Figure 9:
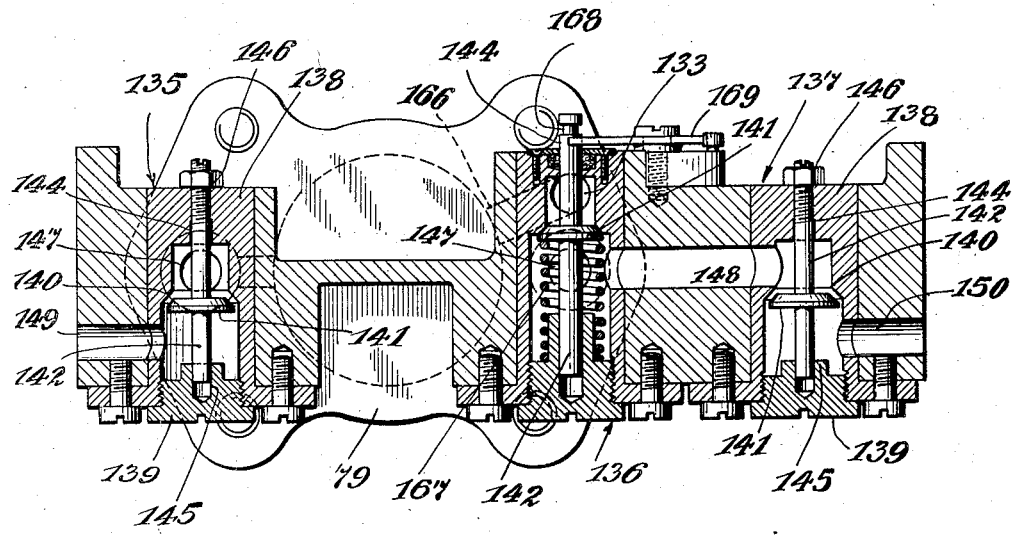
Fig. 9 is a cross-sectional view along line 9—9 of Fig. 4.
Figure 13:
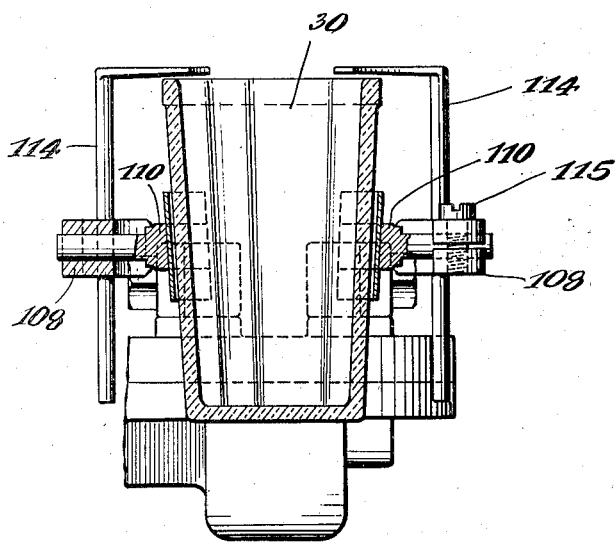
Fig. 13 is a detailed cross-sectional view showing the vessel engaging means in position about a tumbler.

The upper head of the cylinder 49 has three cylindrical bores therethrough as shown in Fig. 9, in which are mounted three valves 135, 136, and 137. The two end valves 135 and 137 each comprise a cup member 138 bolted in the cylindrical bores and a head 139 threaded into the cup. A conical shaped valve seat 140 is adapted to receive a valve member 141 mounted on a stem 142. The stem is slidably mounted in bearings 144 and 145 in the cup and head respectively, and is threaded at one end to receive an adjustment nut 146 which regulates the space between the valve and its seat to control the flow of air through the valve. Air is supplied to the small end of the cups through ducts 147 and the valve is forced open and the air permitted to enter the cylinder 80 through ducts 149 and 150. The path of the air to the valves will be described hereinafter.

Compressed air is admitted through pipe 151 into the control valve 152 through a central port 154. The control valve is shown in Fig. 2 and consists essentially of ports 155 and 156 at its upper and lower ends respectively which are connected to pipes 60 and 61 respectively. A piston 157 having suitable packing rings 158 at its ends and being channelled in its center is adapted to connect the air supply port 154 with either of the ports 155 or 156 depending upon the position of the piston, the idle port being opened to atmosphere through the exhaust ports 183 at the respective ends of the control valve. The piston is connected through the rod 160 to an extension 161 mounted on the rod 162 which has an adjustment nut 164 and lock nut 165 thereon. When the piston 17 moves the member 13 upwardly it slides along the rod 162 and engages nut 164, when it reaches a predetermined upper position, and raises rod 162 and operates control valve 152. The compressed air admitted from the ports 155 and 156 enters pipes 60 and 61 and flows through the bores in the side wall of the cylinder 49 into the valves 135 and 136, respectively. From the valve 135, the air flows through ducts 149 and 153 to the left end of the horizontal cylinder 80. The aperture in the side wall of cylinder 49 permits the air to enter the upper end of the cylinder when it is admitted to the valve 135 thereby forcing the vertical cylinder to its upper position as shown in Figs. 2 and 4. The compressed air enters valve 137 through the port 147 in valve 136 and duct 148 and passes from the valve through ducts 150 and 173 to the right hand end of the cylinder 80. When the valve 136 is open, the air entering it flows past the valve member 141 and through duct 133, extending longitudinally through the wall of the cylinder 49 parallel to the duct 147 to the lower end thereof entering through the duct 166 in the side wall. Therefore, when the valve 136 is opened, the cylinder 49 is forced by compressed air to its lower position so that the arms 106 will deposit the vessel on the conveyor 126 as shown in Fig. 6.

In the operation of this type of device, several elements of the glass machine must be cleared before the vessel may be lowered safely. It is necessary, therefore, that the vertical movement of the vessel be prevented until it has reached a predetermined horizontal position. This is accomplished by the valve 136 and associated locking mechanism. The valve is substantially similar to valves 135 and 137 excepting that it is adapted to be held in closed position by the spring 167; and instead of an adjustment nut, there is an annular channel 168 adapted to be engaged by a locking member 169 to hold the valve open in opposition to the spring 167.

Referring more particularly to Figs. 11 and 12, it will be seen that the locking member 169 is U-shaped and is maintained in contact with the valve stem 144 by means of a spring 170 attached to the cylinder head. A roller 171 mounted on the carriage 82 engages the end of the valve stem 144 and presses it inwardly each time the carriage passes the valve 136. A pin 172 (see Fig. 7) also mounted on the carriage hits one leg of the U member, as the valve stem is pressed inwardly and forces it into locking engagement when the carriage moves away from the glass machine past the valve 135, thereby locking the valve in open position. On the return movement of the carriage toward the glass machine the pin 172 engages the other leg of the member to disengage it from the valve stem and permits the valve to be held in closed position by the spring 167. In this way, the valve 136 is locked in open position while the carriage is on the left side of the valve and is held in closed position while the carriage is on the right side of the valve. Accordingly, it is impossible for air to enter the lower end of the cylinder 49 while the carriage is at the right of the valve 136, that is, adjacent the glass machine, and the cylinder cannot move downwardly at this time. All danger of the vessel contacting with elements of the glass machine is therefore avoided.

In the operation of the machine, the timer 19 which is well known in the art supplies compressed air periodically to the ends of cylinders 12 and 18. The table 4 is also rotated intermittently by means well known in the art. The molds 5 are rotated and are moved one after another directly under the pressing head 8 and the diagonally opposite mold is in each instant directly over the plunger 15. When the table is stopped in this position, the timer 19 operates to supply compressed air to the lower ends of the cylinders 12 and 18 to perform the pressing operation in one mold and to raise the glass from another mold diagonally opposite. The operation of the cylinder 18 to raise the glass moves the member 13 upwardly along the rod 162 and causes it to engage the nut 164 when it has reached its upper position. The piston rod 160 of the control valve 152 being connected to the rod 162 by a suitable extension the control valve is operated to admit air through pipe 151, ports 154 and 156 to pipe 61. The air passes from the pipe 61 through the side wall of the cylinder 49 to valve 136 and from there through duct 148, valve 137 and ducts 150 and 173 to the end of the horizontal cylinder 80. The air continues to flow into the cylinder 80 until the piston 81 is forced to the other end thereof. The speed of the piston is controlled by the adjustment nut 146 on the valve 137. During the horizontal movement of the carriage 82, attached to the piston 81 by piston rod 84, yoke 85 and rod 86; the knob 119, eccentrically mounted on bearing 95 moves in the V-shaped channel 118 to rotate the center part of the bearing 95 together with the arms 106 between which the vessel is held. A projection 122 engages the slot in the plate 121 when the knob has reached the bottom of the V to carry it beyond its dead center and continue the rotation of the vessel engaging arms during the movement along the other portion of the channel.

Figure 5:
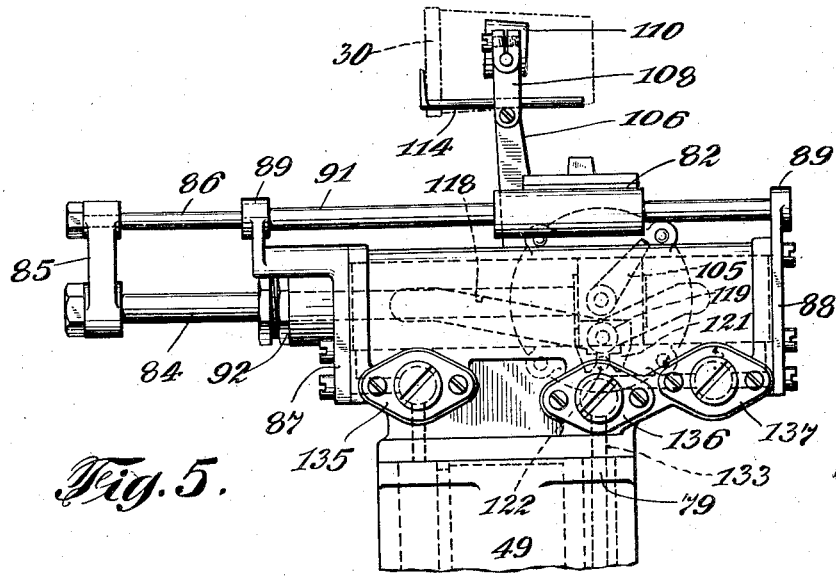

It should be noted here that there is a horizontal portion at the upper ends of the V-shaped channel and during the movement of the knob therein, there is no rotary movement of the arms 106, but the finger 105 on shaft 104 engages either the projection 124 at one end or 125 at the other end whereby the shaft 104 is rotated relative to the bearing 95. This rotates the bevelled gears on shaft 104 which in turn rotate shaft 100 through the bevelled gears thereon and opens the arms 106 in opposition to the spring 109. The arms 106 are held in open position by the finger 105 and projection 124 while the plunger 15 raises the vessel 30 therebetween. The various elements are so positioned so that the vessel is slightly off center with respect to the engaging members on the arms 106 so that the carriage may move away from the glass machine sufficiently to disengage the finger 105 from projection 124, or substantially close the arms 106 about the vessel before the vessel is correctly centered with respect to the holding mechanism. Thus the holding members 110 are correctly centered about the plunger 15 and the vessel 30 when the knob 119 is about to enter the leg of V shaped channel adjacent the glass machine. As the knob 119 is moved along the channel 118, the bearing 95 is rotated and likewise the arms 106 and the vessel 30. As the carriage passes the valve 136, the roller 171 on the carriage engages the valve stem 144 and opens the valve. At the same time a pin 172 engages the locking member 169 which enters the annular channel 168 and retains the valve in open position, permitting air to enter duct 165 passing through the side wall of the cylinder 49 to the lower end thereof, thereby lowering the vertical and horizontal cylinders together with their associated mechanisms, as shown in Figs. 4, 5 and 6. When the piston 81 reaches its extreme position, it is ready to deposit the glass on the conveyor 126. During its horizontal movement, however, the vertical cylinder is moving downwardly and the piston rod 47 is properly adjusted so that the vessel in its final position is resting with one edge on the conveyor. The finger 105 at this time has engaged the projection 125, the arms 106 are open as described with respect to projection 124 and the conveyor moves the vessel off the holding fingers and carries it to its destination.

After sufficient time has elapsed to permit the various operations of the machine, the timer 19, returns the plunger 15 to its lower position which permits the controller piston to fall to its lower position to open the lower end of the vertical cylinder and the right end of the horizontal cylinder to atmosphere through the ports 183 in the upper end of the control valve. At the same time compressed air is admitted through pipe 151, ducts 154 and 155 to pipe 60. The air passes from the pipe 60 through the duct 147 in the side wall of the vertical cylinder through valve 135 and ducts 149 and 153 to the left end of the horizontal cylinder. The carriage 82 is then moved back over the same path to its original position with the arms 106 extending over the table 4 in open position to receive a vessel. The knob 119 during the return of the carriage follows the channel 118 and rotates the bearing 95 in the opposite direction engaging the projection 122 at the bottom of the V to carry it past its dead center. The finger 105 engages the projection 124 and opens the arms 106 so that the vessel may be raised vertically therebetween. It should be noted that during the return movement of the piston 81 that air is admitted through the conduit 163 in the side wall of cylinder 49 to raise the same to its upper position. The valve 135 is adjusted so that this upper position is reached when the carriage is adjacent valve 136, at which time the projection 172 engages the locking member 169 to remove it from the channel 168 and permit the spring 167 to close same to prevent air from being admitted to the lower end of the vertical piston. Thus, it will be seen that the horizontal and vertical cylinders are retained in their upper positions during the time the carriage is on the side of the valve 136 adjacent the glass machine to prevent premature downward movement and contact of the vessels with elements of the glass machine.

It will be seen that the present invention provides a vessel transferring device wherein vessels are removed from the molds in glass machines and transferred automatically to a conveyor without requiring any attention from an operator, that the various operations are independent of the height of the machine or of the height of the conveyor, thereby greatly minimizing the labor required in the operation of the glass machines and rendering the manufactured articles less expensive.

Since various changes can be made in the above embodiment without departing from the spirit of the invention, it is to be understood that all matter herein is to be taken as illustrative and not in a limiting sense. The scope of the invention is defined in the following claims.

Having thus described my invention, what I claim is:—

1. In a vessel handling device, the combination of a support for a vessel, a conveyor adjacent said support but at a substantially different level, means for engaging a vessel on said support, mechanism for raising said vessel and delivering it to said conveyor in inverted position, devices for moving said mechanism in a vertical direction during the raising and moving operation, and means for disengaging said engaging means when said vessel reaches said conveyor.

2. In a vessel handling device, the combination of a table adapted to be intermittently rotated, a plurality of molds on said table adapted to accommodate vessels, a conveyor adjacent said table but at a substantially different level, a plunger for raising said vessels in said molds as said molds are placed consecutively above said plunger, means for engaging the raised vessels and transferring them to said conveyor, and devices for lowering said means during the transferring operation to compensate for the difference in level between said table and said conveyor.

3. In a vessel handling device, the combination of a table adapted to be intermittently rotated, a plurality of molds on said table adapted to accommodate vessels, a conveyor adjacent said table but at a substantially different level, a plunger for raising said vessels in said molds as said molds are placed consecutively above said plunger, means for engaging the raised vessels and transferring them to said conveyor, devices for lowering said means during the transferring operation to compensate for the differences in level between said table and said conveyor, and mechanism for adjusting said lowering devices to control the vertical movement of said means.

4. In a vessel handling device, the combination of a table rotatably mounted, a plurality of molds on said table adapted to accommodate vessels, a plunger for raising said vessels in said molds, a conveyor adjacent said table and at a substantially different level, a transferring mechanism for engaging said vessels and placing them on said conveyor, devices for adjusting said mechanism vertically to permit engagement of the vessel, and means for changing the vertical height of said transferring mechanism during the transferring operation to permit it to lay the vessels on said conveyor.

5. In a vessel handling device, the combination of a table rotatably mounted, a plurality of molds on said table adapted to accommodate vessels, a plunger for raising said vessels in said molds, a conveyor adjacent said table and at a substantially different level, a transferring mechanism for engaging said vessels and placing them on said conveyor, devices for adjusting said mechanism vertically to permit engagement of the vessels, means for changing the vertical height of said transferring mechanism during the transferring operation to permit it to lay the vessels on said conveyor, and means for limiting the change in vertical height of said transferring mechanism to accord with the difference in height of said table and said conveyor.

6. In a device of the class described, the combination of a table intermittently rotatable, a plurality of molds on said table, means for forming glass articles in said molds, a conveyor adjacent said table, devices adjacent said conveyor for raising vessels from said molds, automatic means pneumatically operated for engaging said vessels and transferring them to said conveyor, and a valve for controlling the operation of said automatic means, said valve being operated by said devices.

7. In a device for handling vessels, the combination of a pair of arms adapted to form a gripper for said vessels, means for moving said arms into and out of engagement with said vessels, devices for rotating said arms in a vertical plane to transfer said vessels from one position to another, and mechanism for moving said arms horizontally during said rotation.

8. In a device for handling vessels, the combination of a pair of arms adapted to form a gripper for said vessels, means for moving said arms into and out of engagement with said vessels and devices for rotating said arms to transfer said vessels from one position to another, mechanism for moving said arms horizontally during said rotation, and means for simultaneously moving said arms vertically.

9. In a device for handling vessels, the combination of a pair of arms pivotally mounted, means for rotating said arms on said pivots to engage a vessel when said arms are in a predetermined position, fingers mounted on said arms extending over the edge of the vessel to maintain it in engagement with said arms, means for moving said arms to transfer said vessel from one position to another, and means for disengaging said arm from said vessel.

10. In a device for handling vessels, the combination of a pair of arms pivotally mounted, means for rotating said arms on said pivots to engage a vessel when said arms are in a predetermined position, fingers extending over the edge of the vessel to maintain it in engagement with said arms, pneumatic means for moving said arms horizontally and vertically, devices for rotating said arms during said movement, and means for disengaging said arms from said vessel when a predetermined position has been reached.

11. In a device for handling vessels, the combination of a pair of shafts, pivotally mounted, a pair of arms on said shafts, a piston for moving said arms horizontally, devices for rotating said shafts to cause said arms to engage a vessel when said piston is at one end of its path, and devices for causing said arms to disengage said vessel when said piston is at the other end of its path, and means for moving said piston.

12. In a device for handling vessels, the combination of a pair of shafts, a pair of arms on said shafts, a lever operatively connected to rotate said shafts, a spring adapted to maintain the free ends of said arms in closed position, a piston for moving said arms horizontally, stops at the respective ends of the path of said piston adapted to be engaged by said lever to open the free ends of said arms to engage and disengage vessels, and means for moving said piston.

13. In a device for handling vessels, the combination of a pair of shafts, a pair of arms on said shafts, a lever operatively connected to rotate said shafts, a spring adapted to maintain the free ends of said arms in closed position, a piston for moving said arms horizontally, stops at the respective ends of the path of said piston adapted to be engaged by said lever to open the free ends of said arms to engage and disengage vessels, means for moving said piston, and means for lowering said arms and said piston when a predetermined point in the horizontal movement is reached.

14. In a device for handling vessels, the combination of a pair of shafts, a pair of arms on said shafts, a lever operatively connected to rotate said shafts, a spring adapted to maintain the free ends of said arms in closed position, a piston for moving said arms horiziontally, stops at the respective ends of the path of said piston adapted to be engaged by said lever to open the free ends of said arms to engage and disengage vessels, and means for moving said piston, a stationary piston, a cylinder movable in a vertical direction on said stationary position to move said arms and said first mentioned piston in a vertical direction, and a valve for admitting compressed air to said cylinder when said first mentioned piston has reached a predetermined point in its path of travel.

15. A device for handling vessels, the combination of a vertical cylinder, a stationary piston in said cylinder, a horizontal cylinder, a pair of arms adapted to engage a vessel, a piston in said horizontal cylinder operatively connected to said arms, and a valve adapted to admit air to one end of said horizontal cylinder to move the piston therein, said valve admitting air also to said vertical cylinder so that said arms are moved horizontally and vertically at the same time.

16. A device for handling vessels, the combination of a vertical cylinder, a stationary piston in said cylinder, a horizontal cylinder, a pair of arms adapted to engage a vessel, a piston in said horizontal cylinder operatively connected to said arms, a valve adapted to admit air to one end of said horizontal cylinder to move said piston and said arms, said valve admitting air also to said vertical cylinder so that said arms are moved horizontally and vertically at the same time, and a second valve for admitting air to the other end of said horizontal piston for the return stroke of the arms, said valve admitting air to the other end of said vertical piston to return said arms to their original vertical position.

17. A device for handling vessels, the combination of a vertical cylinder, a stationary piston in said cylinder, a horizontal cylinder, a pair of arms adapted to engage a vessel, a piston in said horizontal cylinder operatively connected to said arms, a valve adapted to admit air to one end of said horizontal cylinder to move said piston and said arms, said valve admitting air also to said vertical cylinder so that said arms are moved horizontally and vertically at the same time, and means for adjusting the height of the stationary piston to determine the vertical movement of said arms.

18. In a device for handling vessels, the combination of a vertical cylinder, a stationary piston in said cylinder, a piston rod adjustable in length to determine the maximum height of said vertical cylinder, a support for said piston and piston rod adjustable in height, a horizontal cylinder mounted on said vertical cylinder, a piston in said horizontal cylinder, means operatively connected to said piston adapted to engage a vessel, and devices to admit air to the respective ends of said horizontal cylinder to reciprocate same in vertical direction.

19. In a device for handling vessels, the combination of a vertical cylinder, a stationary piston in said cylinder, a piston rod adjustable in length to determine the maximum height of said vertical cylinder, a support for said piston and piston rod adjustable in height, a horizontal cylinder mounted on said vertical cylinder, a piston in said horizontal cylinder, means operatively connected to said piston and adapted to engage a vessel, and a series of valves adapted to operate in sequence to admit air to said horizontal cylinder to reciprocate the piston therein, certain of said valves being adapted to operate to admit air to said vertical cylinder after said piston has moved a predetermined distance thereby lowering said horizontal cylinder.

20. In a device for handling vessels, the combination of a vertical cylinder, a stationary piston in said cylinder, a piston rod adjustable in length to determine the maximum height of said vertical cylinder, a support for said piston and piston rod adjustable in height, a piston in said horizontal cylinder, means operatively connected to said piston and adapted to engage a vessel, a valve to admit air to one end of said horizontal cylinder, a second valve to admit air to the other end of said horizontal cylinder, a third valve adapted to admit air to said vertical cylinder when said piston has moved a predetermined distance in said horizontal cylinder, and a control valve adapted to operate certain of said valves in sequence.

21. In a device for handling vessels, the combination of a vertical cylinder, a stationary piston in said cylinder, a horizontal cylinder mounted on said vertical cylinder, a piston movable in said horizontal cylinder, vessel engaging means operatively connected to said movable piston, and devices to admit air to the respective ends of said horizontal cylinder to reciprocate the piston therein, said devices also admitting air to the vertical cylinder to reciprocate said horizontal cylinder in a vertical direction.

22. In a device for handling vessels, the combination of a vertical cylinder, a stationary piston in said cylinder, a horizontal cylinder mounted on said vertical cylinder, a movable piston in said horizontal cylinder, vessel engaging means on said movable piston, and a series of valves adapted to operate in sequence to admit air to said horizontal cylinder to reciprocate the piston therein, and certain of said valves being adapted to admit air to said vertical cylinder after said piston has moved a predetermined distance, thereby changing the vertical position of said horizontal cylinder.

23. In a device for handling vessels, the combination of a vertical cylinder, a stationary piston in said cylinder, a horizontal cylinder mounted on said vertical cylinder, a movable piston in said horizontal cylinder, vessel engaging means on said movable piston, a valve to admit air to one end of said horizontal cylinder, a second valve to admit air to the other end of said horizontal cylinder, a third valve adapted to admit air to said vertical cylinder, and a control valve adapted to operate said valves in sequence to move vessels from one position to a second position in different horizontal and vertical planes from said first position.

24. In a vessel handling device, the combination of a support for a vessel, a second support adjacent said first support but at a different level, a pair of pivoted members adapted to grip gently a vessel on said first support, mechanism for raising and inverting said vessel and moving it toward said second support, devices for moving said mechanism bodily in a vertical direction during the raising and moving operation to compensate for the difference in level of said supports, and means for opening said pivoted members to release said vessel when it reaches said second support.

25. In a device for handling vessels, the combination of a pair of arms mounted on a movable axis adapted to grip a vessel, means for moving said arms toward and away from each other to engage and release vessels, devices for rotating said arms in a vertical plane to transfer said vessels from one position to another, and a mechanism for moving said axis horizontally, whereby said arms are rotated about a moving center.

26. In a device of the class described, the combination of a carriage adapted to be moved horizontally, means mounted on said carriage to rotate about a substantially horizontal axis and adapted to engage a vessel, and devices for rotating said means in a vertical plane during the horizontal movement of said carriage whereby the vessel is rotated in a vertical plane about a moving center.

27. In a device for handling vessels, the combination of a carriage adapted to be moved horizontally, a pair of arms rotatably mounted on said carriage to rotate about a substantially horizontal axis and adapted to engage a vessel, a guideway, and means engaging said guideway to rotate said arms in a vertical plane as said carriage moves horizontally.

28. In a device of the class described, the combination of a V-shaped guideway, a carriage adapted to be moved along a path adjacent said guideway, a pair of arms rotatably mounted on said carriage and adapted to engage a vessel, and a knob operatively connected to said arms and adapted to follow said guideway to rotate said arms as said carriage moves along its path.

29. In a device for handling vessels, the combination of a pair of arms adapted to engage a vessel, pneumatic means for moving said arms horizontally and vertically, devices for rotating said arms during said movement, and means for disengaging said arms from said vessel when a predetermined position has been reached.

30. In a vessel handling device of the class described, the combination of a pair of shafts, a pair of arms on said shafts, a gear on each of said shafts, and a third gear meshing with the gears on said shafts to rotate same and to cause said arms to grip and release vessels.

31. In a device of the class described, the combination of gripping means adapted to engage a vessel, a shaft operatively connected to said gripping means and a finger on said shaft adapted to engage stops when said arms are in predetermined positions to rotate said shaft and to cause said arms to engage a vessel.

32. In a device of the class described, the combination of a carriage adapted to be reciprocated horizontally between predetermined limits, means for engaging a vessel, devices for mounting said means upon said carriage to rotate in a substantially vertical plane, and mechanism for rotating said means in a substantially vertical plane as said carriage is reciprocated horizontally.

33. In a device of the class described, the combination of vessel engaging means mounted to rotate in a vertical plane, and automatic means operative when said means reaches a predetermined position to lower said means vertically, whereby a vessel may be transferred from a support at one level to a conveyor at a substantially different level.

34. In a device of the class described, the combination of a vessel engaging means mounted to rotate in a vertical plane whereby a vessel may be inverted during it's movement, and automatic means operative when said vessel engaging means reaches a predetermined position to lower bodily said vessel engaging means independently of said rotating movement, whereby said vessel is delivered to a conveyor.

35. In a device for handling vessels, the combination of a pair of arms pivotally mounted, means for rotating said arms on said pivots to engage a vessel when said arms are in a predetermined position, pneumatic means for moving said arms horizontally, means for moving said arms vertically, devices for rotating said arms during said horizontal and vertical movement, and means for disengaging said arms from said vessel when a predetermined position has been reached.

36. In a vessel handling device, the combination of a vertical cylinder, a horizontal cylinder, a pair of arms adapted to engage a vessel, a piston in said horizontal cylinder operatively connected to said arms, and a valve adapted to admit air to one end of said horizontal cylinder to move the piston therein, said valve admitting air also to said vertical cylinder so that said arms are moved horizontally and vertically at the same time.

37. In a vessel handling device, the combination of means for gripping a vessel in one position, a lever engaging said gripping means to rotate said means about one end of said lever through a curved path in a vertical plane to another position, mechanism for moving said lever horizontally to cause said vessel to rotate about a moving center, and devices for opening said gripping means when said vessel has reached its second position.

38. In a device for handling vessels, the combination of a guideway, a carriage adapted to be moved along a substantially horizontal path adjacent said guideway, a pair of arms rotatably mounted on said carriage and adapted to engage a vessel, and means engaging said guideway to rotate said arms in a vertical plane as said carriage moves along said path.

39. In a vessel handling device adapted to transfer vessels from a series of molds to a conveyor, the combination of a plunger for raising said vessels in said molds, a conveyor adjacent said table, a transferring mechanism pneumatically operated for engaging said vessels and moving them in a substantially vertical plane toward said conveyor, and pneumatic means for moving said transferring mechanism vertically to permit said mechanism to lay the vessels on said conveyor.

40. In a vessel handling device, the combination of a support for a vessel, a second support adjacent said first support but at a substantially different level, means for gripping a vessel on said first support, mechanism for raising said vessel and delivering it to said second support in inverted position, devices for lowering said mechanism to compensate for the difference in level of said supports, and means for opening said gripping means when said vessel reaches said second support.

41. In a vessel handling device, the combination of a table rotatably mounted, a plurality of molds on said table adapted to accommodate said vessels, a conveyor adjacent said table and at a substantially different level, and transferring mechanism for engaging said vessels and placing them on said conveyor in inverted position, and means for changing the vertical height of said transferring mechanism during the transferring operation to permit it to lay the vessels on said conveyor at a substantially different level.

42. In a vessel handling device, the combination of a table rotatably mounted, a plurality of molds on said table adapted to accommodate vessels, a conveyor adjacent said table and at a substantially different level, and a pivoted transferring mechanism for engaging said vessels and placing them on said conveyor, means for changing the vertical height of said pivoted transferring mechanism during the transferring operation to permit the transferring mechanism to lay the vessels on said conveyor, and devices for limiting the change in vertical height of said transferring mechanism to accord with the difference in height of said table and said conveyor.

43. A device for handling vessels, the combination of a cylinder vertically mounted, a piston in said cylinder, a second cylinder horizontally mounted, a piston in said second cylinder, means operatively connected to the piston in said horizontal cylinder for gripping a vessel, and means adapted to admit air to one end of said horizontal cylinder to move the piston therein, said means admitting air at the same time to said vertical cylinder so that said arms are moved horizontally and vertically simultaneously.

MAX JAEGER.